US007809562B2

(12) United States Patent
Hanazawa

(10) Patent No.: US 7,809,562 B2
(45) Date of Patent: Oct. 5, 2010

(54) VOICE RECOGNITION SYSTEM AND METHOD FOR RECOGNIZING INPUT VOICE INFORMATION

(75) Inventor: Ken Hanazawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1105 days.

(21) Appl. No.: 11/492,982

(22) Filed: Jul. 26, 2006

(65) Prior Publication Data

US 2007/0027693 A1    Feb. 1, 2007

(30) Foreign Application Priority Data

Jul. 27, 2005    (JP)    ............................. 2005-217534

(51) Int. Cl.
*G06F 17/21*    (2006.01)
*G10L 15/00*    (2006.01)
*G10L 17/00*    (2006.01)
*G10L 21/00*    (2006.01)

(52) U.S. Cl. ......................... 704/246; 704/10; 704/231; 704/250; 704/251; 704/270

(58) Field of Classification Search .................. 704/246
See application file for complete search history.

(56) References Cited

U.S. PATENT DOCUMENTS 6,173,259 B1 *   1/2001   Bijl et al. ..................... 704/235
6,185,535 B1 *   2/2001   Hedin et al. ................. 704/270
6,338,038 B1 *   1/2002   Hanson ....................... 704/500
6,687,339 B2 *   2/2004   Martin ....................... 379/88.14

FOREIGN PATENT DOCUMENTS

| CN | 1448915 A | 10/2003 |
| JP | 2003-241796 A | 8/2003 |
| JP | 2004-133699 A | 4/2004 |

\* cited by examiner

*Primary Examiner*—David R Hudspeth
*Assistant Examiner*—Justin W Rider
(74) *Attorney, Agent, or Firm*—Sughrue Mion, PLLC

(57) ABSTRACT

A voice recognition system has a recognition dictionary storing voice information, a primary voice recognition means for performing primary voice recognition in response to input voice information pronounced by a user by the use of the recognition dictionary, and a recognition result judging means for deciding whether the primary voice recognition result is to be accepted or rejected. The voice recognition system includes a transceiver means for sending the input voice information of the user to an additional voice recognition means when the primary voice recognition result is rejected by the recognition result decision means and for receiving a secondary voice recognition result produced as a result of secondary voice recognition of the additional voice recognition means, and a recognition result output means for outputting the primary or secondary voice recognition result to an exterior of the voice recognition system. The voice recognition system also includes a settled result input means for receiving settlement information on the primary or secondary voice recognition result and a dictionary content control means for updating said recognition dictionary based on the settlement information.

12 Claims, 8 Drawing Sheets

VOICE RECOGNITION SYSTEM AND METHOD FOR RECOGNIZING INPUT VOICE INFORMATION

This application claims priority to prior Japanese patent application JP 2005-217534, the disclosure of which is incorporated herein by reference.

BACKGROUND OF THE INVENTION

1. Field of the Invention

The present invention relates to a voice recognition system and method, and more particularly to a server-client voice recognition system and method. The present invention also relates to a computer-readable storage medium having a program recorded thereon for voice recognition. The present invention is applicable to a voice input interface such as a cellular phone or a personal digital assistant.

2. Description of the Related Art

FIG. 1 is a schematic diagram showing an example of a conventional server-client voice recognition system that has a client terminal device and a server device. In the conventional server-client voice recognition system, the client terminal device processes voice recognition of a relatively light load while the server device processes voice recognition of a comparatively heavy load. Specifically, as shown in FIG. 1, the conventional server-client voice recognition system has a client terminal device 310 and a server device 320, which are connected to each other via a communication network 330.

The client terminal device 310 includes a voice input unit 311 for inputting a user's voice, a voice pre-processing unit 312 for performing pre-processing, such as a waveform analysis of an input voice data, and a selector unit 313 for selecting whether subsequent content recognition of pre-processed voice data is to be carried out either in an internal process (in the client terminal device 310) or an external process (in the server device 320). The client terminal device 310 also includes a primary voice recognition unit 314 and a primary recognition dictionary 315 for the internal content recognition process, a communication unit 316 for communicating with the server device 320, and a recognition result output unit 317 for sending a result of voice recognition outside the system.

The server device 320 includes a communication unit 321 for communicating with the client terminal device 310, a secondary voice recognition unit 322, and a secondary recognition dictionary 323. The secondary voice recognition unit 322 and the secondary recognition dictionary 323 are used for the external voice recognition process. For example, this type of a voice recognition system has been disclosed in Japanese Unexamined Patent Publications Nos. 2003-241796 and 2004-133699.

In such a conventional voice recognition system, the client terminal device 310 and the server device 320 operate as follows.

Specifically, when voice data is inputted into the voice input unit 311 of the client terminal device 310, the voice pre-processing unit 312 carries out pre-processing of the voice data, such as a sound waveform analysis of the input voice data and the like. The selector unit 313 operates in response to the result of the sound waveform analysis and selects whether recognition of contents in the input voice data is to be carried out either in the primary voice recognition unit 314 in the client terminal device 310 or the secondary voice recognition unit 322 in the server device 320.

If the selector unit 313 selects the primary voice recognition unit 314, the primary voice recognition unit 314 performs voice recognition of the voice data by the use of the primary recognition dictionary 315 and sends a recognition result to the recognition result output unit 317. If the selector unit 313 selects the secondary voice recognition unit 322, the pre-processed voice data is sent from the communication unit 316 in the client terminal device 310 to the server device 320 via the communication network 330. When the pre-processed voice data is received from the client terminal device 310 by the communication unit 321 in the server device 320, the secondary voice recognition unit 322 immediately is operated to perform voice recognition of the received voice data by the use of the secondary recognition dictionary 323. The communication unit 321 returns a voice recognition result to the client terminal device 310 via the communication network 330. When the communication unit 316 in the client terminal device 310 receives the voice recognition result, the recognition result output unit 317 supplies the result to the user.

However, in the conventional voice recognition system, the primary recognition dictionary 315 in the client terminal device 310 has a small capacity in order to alleviate an amount of processes required for voice recognition. Accordingly, the client terminal device 310 has a very limited vocabulary for recognition. This often makes recognition of users' voices difficult in dependency upon words in the conventional voice recognition system.

In such a case, consideration might be made about a way to successively add unrecognized words by each user to the primary recognition dictionary 315 in the client terminal device 310. However, such a way to add unrecognized words to the primary recognition dictionary 315 imposes a severe burden on the user and results in an increase of an amount of calculation in the client side. This brings about various problems, such as a delay, during the voice recognition process.

Furthermore, in the conventional example, when the client terminal device 310 receives a result of voice recognition from the server device 320, such a result is solely delivered to a user and is not accumulated in the client terminal device 310. Accordingly, the conventional voice recognition system is inconvenient in that it cannot satisfy user's needs of getting frequently-used words (vocabulary) or recently-used words.

SUMMARY OF THE INVENTION

The present invention has been made in view of the above drawbacks. It is, therefore, an object of the present invention to provide a voice recognition system, a voice recognition method, and a computer-readable storage medium having a program recorded thereon for voice recognition which can provide a word that meets user's needs effectively to the user, for example, even if a client terminal device has a small processing capability.

According to a first aspect of the present invention, there is provided a voice recognition system which can provide a word that meets user's needs effectively to the user. The voice recognition system has a recognition dictionary storing voice information, a primary voice recognition means for performing a primary voice recognition on input voice information of a user based on the recognition dictionary to produce a primary voice recognition result of the input voice information, and a recognition result decision means for judging a reliability of the primary voice recognition result produced by the primary voice recognition means and for deciding whether to accept or reject the primary voice recognition result. The voice recognition system includes a transceiver means for sending the input voice information of the user to an additional voice recognition means when the primary voice recognition result is rejected by the recognition result decision means and for receiving a secondary voice recognition result produced by a voice recognition function of the additional voice recognition means, and a recognition result output means for outputting the primary voice recognition result outputted from the recognition result decision means or the secondary voice recognition result received by the transceiver means to an exterior of the voice recognition system.

The voice recognition system also includes a settled result input means for receiving settlement information on the primary voice recognition result or the secondary voice recognition result outputted to the exterior of the voice recognition system, and a dictionary content control means for updating the recognition dictionary based on the settlement information inputted by the settled result input means.

According to the present invention, even if the primary voice recognition means has a small processing capability, the dictionary content control means continuously updates the recognition dictionary with a settled recognition result. Therefore, the voice recognition system can provide a recognized word that matches the user's request. Further, even if the user says or pronounces a word that is not registered in the recognition dictionary, a recognition result (secondary voice recognition result) can readily be obtained by the voice recognition function of the additional voice recognition means, in addition to the primary recognition result of the primary voice recognition means. Thus, even if the primary voice recognition means has a small processing capability, a word that is not registered in the recognition dictionary can be recognized by the voice recognition system. Furthermore, a word or a set of words that have been recognized in the server device can automatically be added to the recognition dictionary by the dictionary content control means. Therefore, it is possible to lighten a load imposed on a user when the recognition dictionary is customized for the user.

According to a second aspect of the present invention, the above decision to accept or reject the primary recognition result depends on an external decision system. Specifically, the recognition result judgment means has a recognition result presentation means for presenting the primary voice recognition result produced by the primary voice recognition means to an external decision system, and a decision result input means for receiving a decision result to accept or reject the primary voice recognition result from the external decision system.

This arrangement also has equivalent functions to the functions described in the first aspect of the present invention. Additionally, when a decision result (command) is issued by the external decision system (e.g., a user), the decision result is employed as decision information on the primary recognition result. Accordingly, the user can determine whether to update the recognition dictionary. Thus, it is possible to generate a recognition dictionary having a high processing efficiency for voice recognition to ensure enhanced reliability of processing voice information.

The primary voice recognition means may include a voice pre-processing unit operable to analyze the input voice information so as to extract a feature thereof, and a primary voice recognition unit operable to output the primary voice recognition result based on the feature extracted by the voice pre-processing unit. In this case, the primary voice recognition of the input voice information can promptly be completed by the primary voice recognition means. Further, the secondary voice recognition can also be performed with high accuracy.

Further, the dictionary content control means may be configured to delete a word based on at least one of order of past settlement information and a frequency of the past settlement information when a size of the words in the recognition dictionary exceeds a processing capability of the voice recognition system. In this case, even if the recognition dictionary has a small capacity and the primary voice recognition means has a small processing capability, the primary recognition result can promptly be outputted for the user's preference. Further, since a user's past history of use is used as information for the recognition dictionary, which is used to obtain the primary recognition result, it is possible to obtain information suitable for the user's preference.

Furthermore, the dictionary content control means may be configured to send update information to the additional voice recognition means when the recognition dictionary is to be updated. In this case, the additional voice recognition means can have a recognition dictionary including the contents of the recognition dictionary used by the primary voice recognition means. Accordingly, the voice recognition can be performed promptly.

The additional voice recognition means may be configured by a server device having a voice recognition function. The server device may be communicable with the transceiver means via a communication network.

According to a third aspect of the present invention, there is provided a voice recognition method which can provide a word that meets user's needs effectively to the user. In this method, a voice information of a user is inputted, and a primary voice recognition of the voice information is performed based on a recognition dictionary storing voice information to produce a primary voice recognition result of the input voice information. A reliability of the primary voice recognition result is judged, and it is decided whether to accept or reject the primary voice recognition result. The input voice information of the user is sent to an additional voice recognition means when the primary voice recognition result is rejected. A secondary voice recognition result is produced by a voice recognition function or secondary voice recognition of the additional voice recognition means and received. The primary voice recognition result or the secondary voice recognition result is outputted to an exterior of a voice recognition system. Settlement information on the primary voice recognition result or the secondary voice recognition result outputted to the exterior of the voice recognition system is inputted, and the recognition dictionary is updated based on the inputted settlement information.

According to the present invention, even if the primary voice recognition means has a small processing capability, the voice recognition system can efficiently and promptly provide a recognized word that suits the user's preference. Further, a word or a set of words that have been recognized in the server device can automatically be added to the recognition dictionary by the dictionary content control means. Therefore, it is possible to reduce a load on a user which would be caused when the recognition dictionary is customized for the user.

According to a fourth aspect of the present invention, the above decision to accept or reject the primary recognition result depends on an external decision system. Specifically, instead of the above decision process, the primary voice recognition result is presented to an external decision system, and a decision result to accept or reject the primary voice recognition result is received from the external decision system. This configuration also has equivalent functions to the functions described in the third aspect of the present invention. Additionally, when a decision result (command) is issued by the external decision system (e.g., a user), the decision result is employed as decision information on the primary recognition result. Accordingly, the user can determine whether to update the recognition dictionary. Thus, it is possible to generate a recognition dictionary having a high processing efficiency for voice recognition to ensure enhanced reliability of processing voice information.

Further, a word may be deleted based on at least one of order of past settlement information and a frequency of the past settlement information when a size of the words in the recognition dictionary exceeds a processing capability of the voice recognition system. Furthermore, when the recognition dictionary is to be updated, update information may be sent to the additional voice recognition means.

According to a fifth aspect of the present invention, there is provided a computer-readable storage medium having a program recorded thereon for voice recognition which can provide a word that meets user's needs effectively to the user. The program recorded on the computer-readable storage medium is configured to execute the following procedure. A voice information of a user is inputted, and a primary voice recognition of the voice information is performed based on a recognition dictionary storing voice information of the words to produce a primary voice recognition result of the input voice information. A reliability of the primary voice recognition result is judged, and it is decided whether to accept or reject the primary voice recognition result. The input voice information of the user is sent to an additional voice recognition means when the primary voice recognition result is rejected. A secondary voice recognition result is produced by a voice recognition function of the additional voice recognition means and received. The primary voice recognition result or the secondary voice recognition result is outputted to an exterior of a voice recognition system. Settlement information on the primary voice recognition result or the secondary voice recognition result outputted to the exterior of the voice recognition system is inputted, and the recognition dictionary is updated based on the inputted settlement information.

According to the present invention, even if the primary voice recognition means has a small processing capability, the recognition dictionary is continuously updated with a settled recognition result. Therefore, it is possible to provide a recognized word that suits the user's preference. Further, even if the user says a word that is not registered in the recognition dictionary, a recognition result (secondary voice recognition result) can readily be obtained by the voice recognition function of the additional voice recognition means, in addition to the primary recognition result of the primary voice recognition means. Thus, even if the primary voice recognition function has a small processing capability, it is possible to recognize a word that is not registered in the recognition dictionary with ease. Furthermore, a word or a set of words that have been recognized in the server device can automatically be added to the recognition dictionary by the dictionary content control function. Therefore, it is possible to reduce a load on a user which would be caused when the recognition dictionary is customized for the user.

According to a sixth aspect of the present invention, the above decision to accept or reject the primary recognition result depends on an external decision system. Specifically, instead of the above decision function, the primary voice recognition result is presented to an external decision system, and a decision result to accept or reject the primary voice recognition result is received from the external decision system. This arrangement also has equivalent functions to the functions described in the fifth aspect of the present invention. Additionally, when a decision result (command) is issued by the external decision system (e.g., a user), the decision result is employed as decision information on the primary recognition result. Accordingly, the user can determine whether to update the recognition dictionary. Thus, it is possible to generate a recognition dictionary having a high processing efficiency for voice recognition to ensure enhanced reliability of processing voice information.

Further, a word may be deleted based on at least one of order of past settlement information and a frequency of the past settlement information when a size of the words in the recognition dictionary exceeds a processing capability of the voice recognition system. Furthermore, when the recognition dictionary is to be updated, update information may be sent to the additional voice recognition means.

Thus, even if a client terminal device has a small processing capability, it is possible to provide a word that meets the user's needs.

As described above, according to the present invention, even if a client terminal device or a voice recognition means has a small processing capability for a primary voice recognition, it is possible to provide a word that suits the user's preference because a recognition dictionary is continuously updated with a settled recognition result.

The above and other objects, features, and advantages of the present invention will be apparent from the following description when taken in conjunction with the accompanying drawings which illustrate preferred embodiments of the present invention by way of example.

DESCRIPTION OF THE PREFERRED EMBODIMENTS

Figure 1:
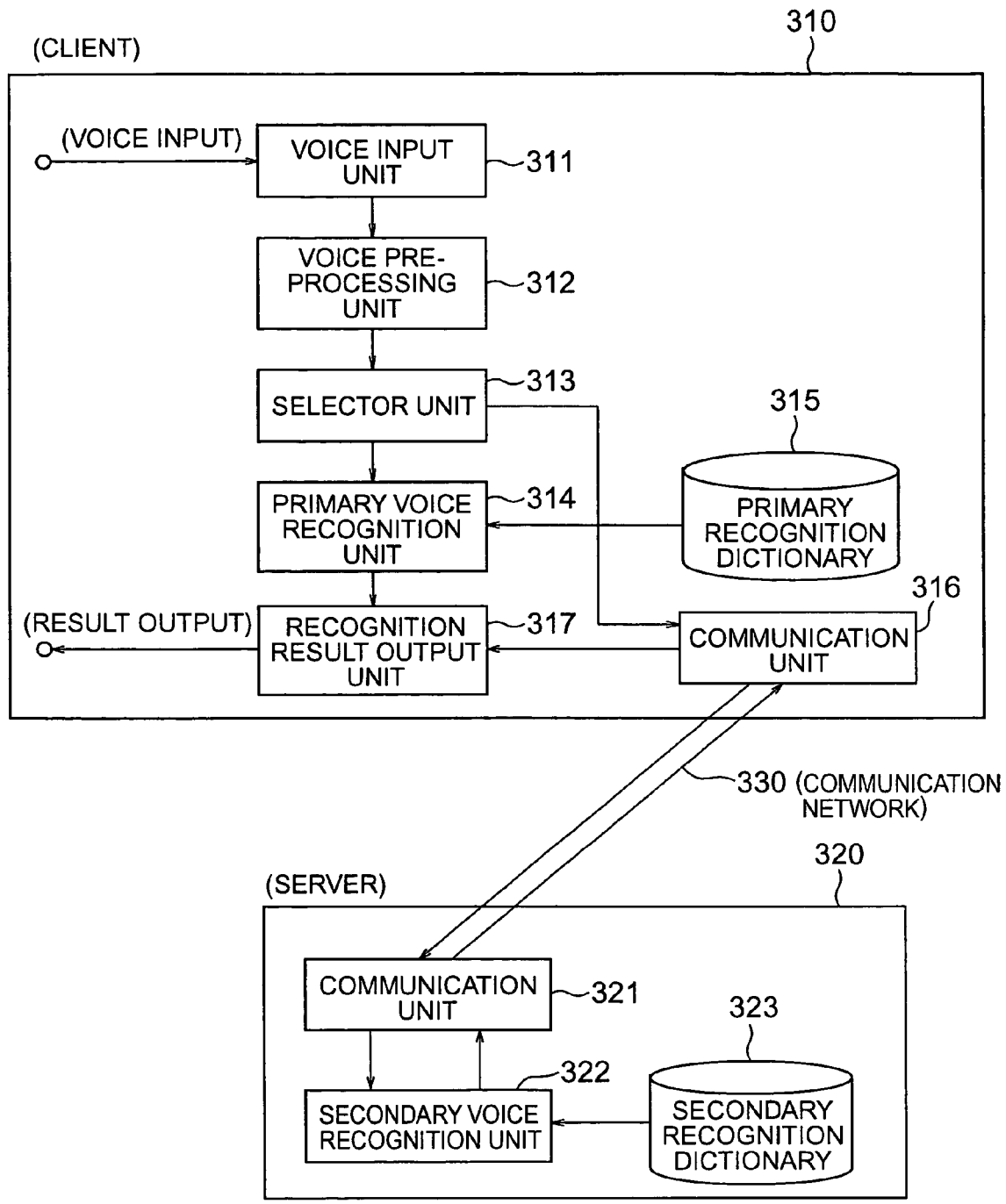
FIG. 1 is a schematic diagram showing an example of a conventional server-client voice recognition system.

A voice recognition system according to embodiments of the present invention will be described below with reference to FIGS. 2 through 8. Similar or corresponding parts are denoted by similar or corresponding reference numerals throughout drawings, and will not be described below repetitively.

Figure 2:
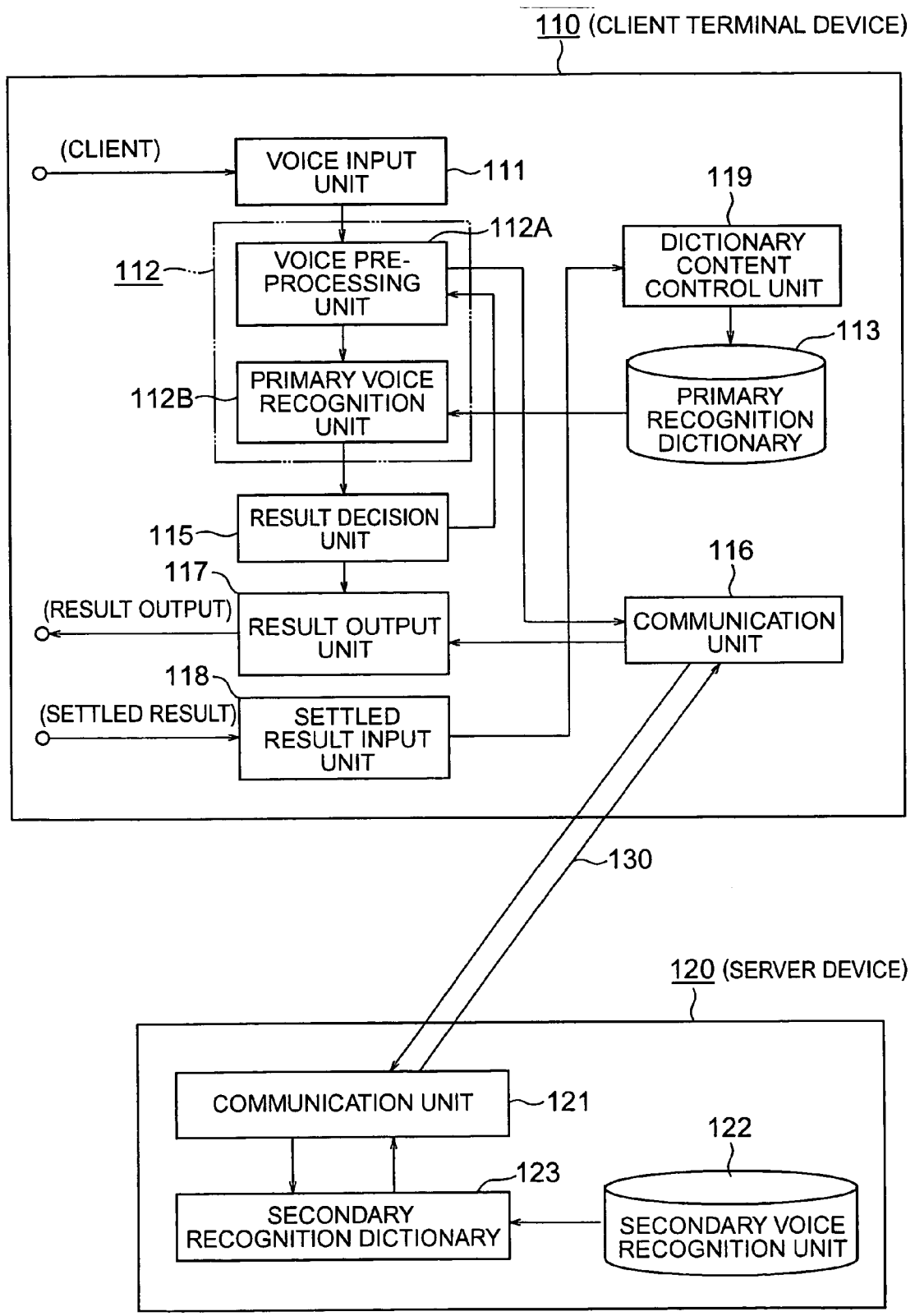
FIG. 2 is a schematic diagram showing an arrangement of a voice recognition system according to a first embodiment of the present invention.

FIG. 2 shows the entirety of a voice recognition system according to a first embodiment of the present invention. As shown in FIG. 2, the voice recognition system includes a client terminal device 110 for receiving a user's voice and a server device (additional voice recognition means) 120 communicable with the client terminal device 110 via a communication network 130. The illustrated client terminal device 110 performs primary recognition of the user's voice to produce a primary recognition result of the user's voice. The server device 120 performs secondary recognition of the user's voice to produce a secondary recognition result of the user's voice and outputs the secondary recognition result to the client terminal device 110.

The client terminal device 110 includes a voice input unit 111 for receiving an input user's voice or sound, a primary recognition dictionary 113, and a primary voice recognition means 112 for performing primary recognition of the input voice by the use of the primary recognition dictionary 113. Furthermore, a result decision unit (recognition result decision means) 115 is also included in the client terminal device 10 to determine whether a result of the primary recognition is to be accepted or rejected. In addition, a communication unit (transceiver means) 116 is further included to send the voice data to the server device (additional voice recognition means) 120 when the primary recognition result of the voice data is rejected in the client terminal device 110. In this event, the communication unit 116 requests the server device 120 to perform secondary recognition of the voice data, and receives a result of the secondary recognition. In the client terminal device 110, a result output unit (recognition result output means) 117 serves to output the result of the recognition outside the system.

The output recognition result is settled or decided as a decided result of recognition by the user. The client terminal device 110 includes a decision result input unit (decision result input means) 118 for receiving the decided result of recognition. The client terminal device 110 also includes a dictionary content control unit (dictionary content control means) 119 for updating the primary recognition dictionary 113 with reference to the decided result of recognition received by the decision result input unit 118.

The illustrated primary voice recognition means 112 performs primary recognition of the voice data. Specifically, the primary voice recognition means 12 includes a voice pre-processing unit 112A operable to analyze an input voice so as to extract features from the input voice and a primary voice recognition unit 112B operable to output a primary recognition result of the voice data based on the extracted voice features.

The client terminal device 110 may have a memory (not shown) storing a program for voice recognition and a central processing unit (CPU) operable to execute the program stored in the memory. In this event, the CPU executes the program to operate the voice pre-processing unit 112A, the primary voice recognition unit 112B, the result decision unit 115, the communication unit 116, the result output unit 117, the decision result input unit 118, and the dictionary content control unit 119 in accordance with the program.

Next, description will be made about operations of the respective components in the voice recognition system.

Figure 3:
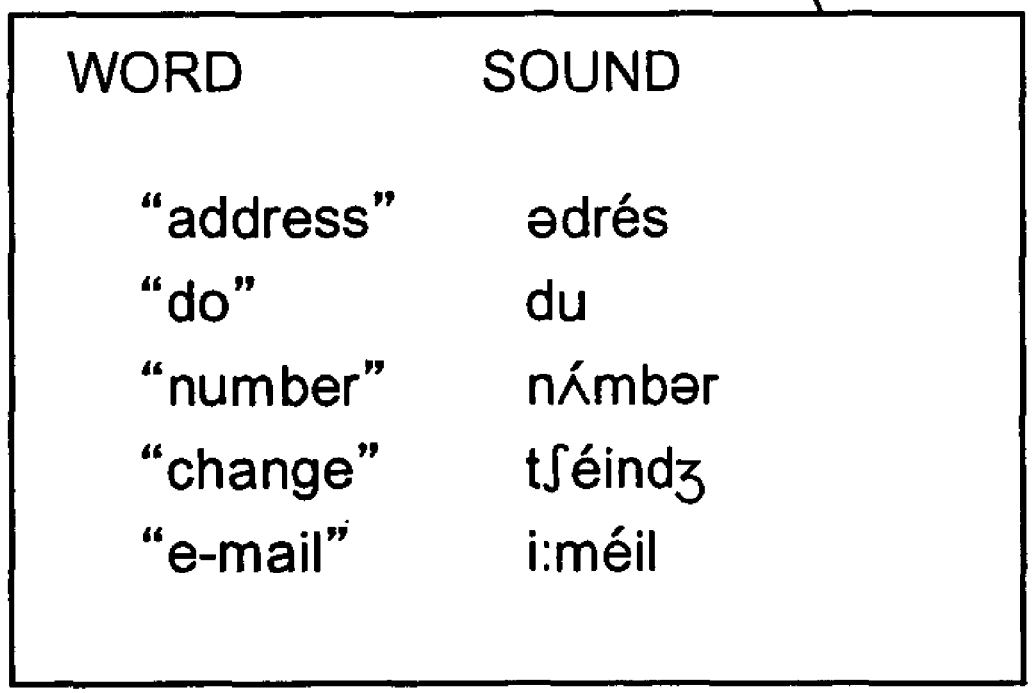
FIG. 3 is an explanatory diagram showing an example of a primary recognition dictionary in the voice recognition system shown in FIG. 2.

For example, the voice input unit 111 may include a microphone and receives a user's voice. The voice pre-processing unit (feature output means) 112A is configured to perform a sound analysis of the input voice and extract a voice feature from the input voice. The primary recognition dictionary 113 has dictionary data including a vocabulary (words) and sounds of the words registered therein as shown in FIG. 3.

The primary voice recognition unit (voice recognition means) 112B is configured to retrieve a word corresponding to the user's voice from the primary recognition dictionary 113 based on the voice feature extracted by the voice pre-processing unit 112A. For example, when the user says "e-mail address," the primary voice recognition unit 112B retrieves words corresponding to the user's voice from the primary recognition dictionary 113. Specifically, the primary voice recognition unit 112B reads both words "e-mail" and "address" from the primary recognition dictionary 113 on the basis of features inputted from the voice pre-processing unit 112A. Then, the primary voice recognition unit 112B attaches the word "e-mail" to the word "address" and produces or generates a set of words "e-mail address." Thereafter, the primary voice recognition unit 112B supplies the set of words "e-mail address" to the result decision unit 115. If the primary voice recognition unit 112B fails to read the corresponding word, then the primary voice recognition unit 112B notifies the result decision unit 115 of the failure.

For example, when a word is inputted from the primary voice recognition unit 112B into the result decision unit (recognition result decision means) 115, the result decision unit 115 calculates a likelihood or similarity of the input word. If the likelihood of the input word is high, the result decision unit 115 judges that the input word is one required by the user and accepts the input word. If the likelihood of the inputted word is low, the result decision unit 115 judges that the input word is different from the one required by the user and rejects the input word.

For example, when input words are "e-mail address," which are registered in the primary recognition dictionary 113, the result decision unit 115 judges a likelihood of the inputted words to be high and accepts the input words. Let another word "registration" be not registered in the primary recognition dictionary 113. If the word "registration" is wrongly recognized, for example, as "change" by the primary voice recognition unit 112B and is inputted to the result decision unit 115, then the result decision unit 115 judges a likelihood of the inputted word to be low and rejects the inputted word.

If a word outputted from the primary voice recognition unit 112B is rejected by the result decision unit 115, the communication unit (transceiver means) 116 sends the voice features extracted by the voice pre-processing unit 112A to the server device 120 via the communication network 130. Then, the communication unit 116 receives a voice recognition result from the server device 120 via the communication network 130. The result output unit (recognition result output means) 117 is configured to output a voice recognition result (primary or secondary recognition result) of the user's voice, which is produced in the client terminal device 110 or the server device 120, to the outside of the system.

When the user inputs a request to settle or decide an outputted recognition result, the settled or decided result input unit (settled result input means) 118 outputs the request to the dictionary content control unit (dictionary content control means) 119. The dictionary content control unit (dictionary content control means) 119 registers new dictionary data in the primary recognition dictionary 113 according to the received request. Further, the dictionary content control unit 119 deletes oldest words from the primary recognition dictionary 113 if the number of registered words exceeds the processing capability of the client terminal device 110 (execution of a word deletion function).

As shown in FIG. 2, the server device 120, which serves as an additional voice recognition means, includes a communication unit 121, a secondary recognition dictionary 122, and a secondary voice recognition unit 123. The communication unit 121 is configured to receive a feature from the client terminal device 110 via the communication network 130 and send a secondary voice recognition result to the client terminal device 110 via the communication network 130.

The secondary recognition dictionary 122 registers dictionary data including words corresponding to voices that could not be recognized by the client terminal device 110, together with reading of the words registered therein. Further, the secondary voice recognition unit 123 has a function of retrieving a word corresponding to the user's voice from the secondary recognition dictionary 122 based on a voice feature received from the client terminal device 110. In addition, the secondary voice recognition unit 123 performs secondary voice recognition of the user's voice, and returns a secondary recognition result to the client terminal device 110.

Next, operation of the voice recognition system in the first embodiment will be described with reference to a flow chart shown in FIG. 4.

Figure 4:
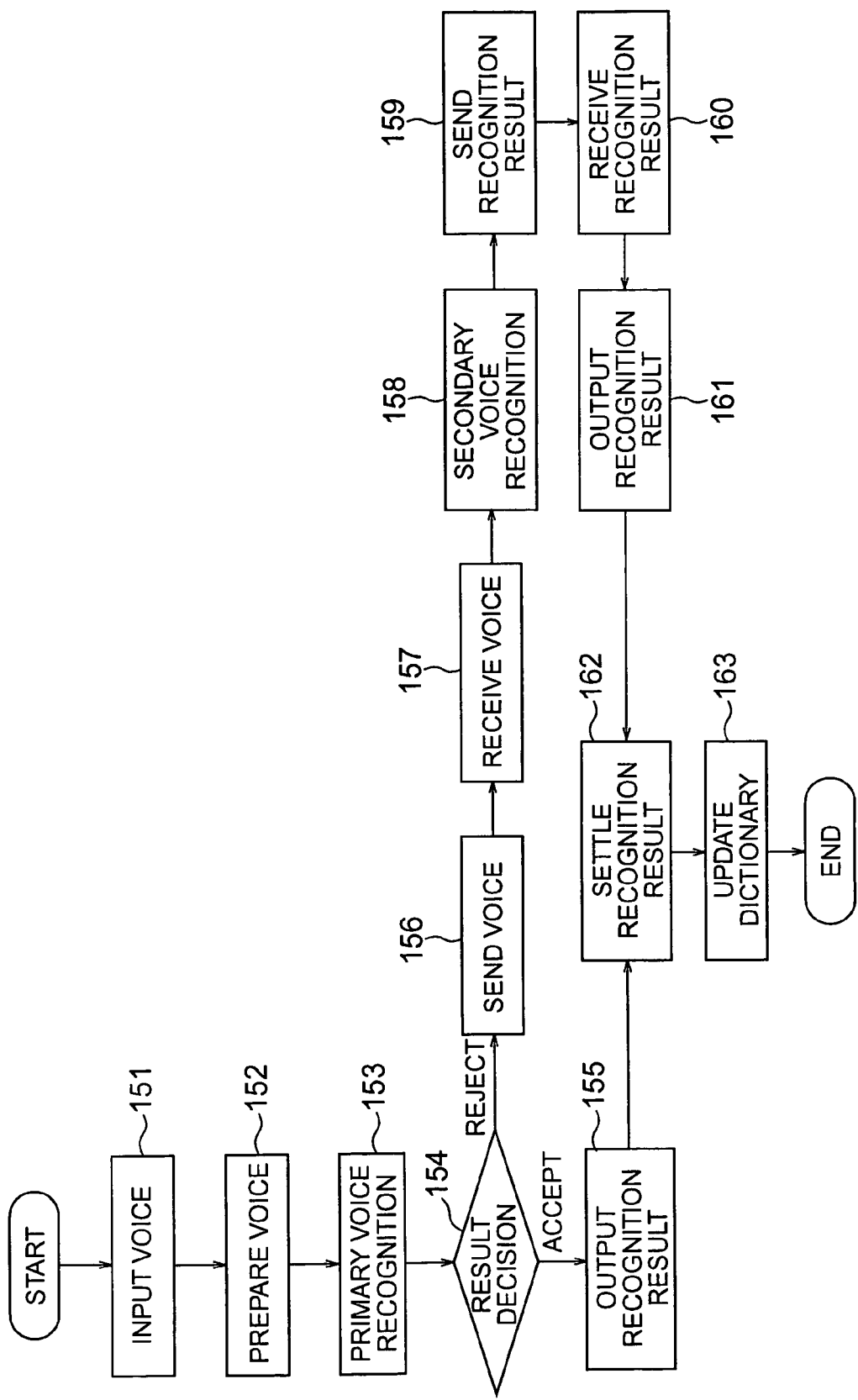
FIG. 4 is a flow chart showing operation of the voice recognition system shown in FIG. 2.

As shown in FIG. 4, a user's voice is inputted into the voice input unit 111 in the client terminal device 110 (Step 151). The input voice is subjected to a sound analysis in the voice pre-processing unit 112A to extract a feature of the voice (Step 152). Then, the primary voice recognition unit 112B retrieves the primary recognition dictionary 113 and performs primary voice recognition on the basis of the features extracted by the voice pre-processing unit 112A (Step 153: voice recognition process).

For example, when the user says or pronounces "e-mail address," the primary voice recognition unit 112B retrieves words from the primary recognition dictionary 113, reads words "e-mail" and "address" from the primary recognition dictionary 113 based on the features of both the words, and outputs the words "e-mail address" to the result decision unit 115. If the primary voice recognition unit 112B fails to read any corresponding word from the primary recognition dictionary 113, the primary voice recognition unit 112B might output a false word to the result decision unit 115. FIG. 3 shows an example of words stored in the primary recognition dictionary 113.

Next, the result decision unit 115 calculates a likelihood of the inputted word or words and decides whether each of the words is accepted or rejected (Step 154: recognition result decision process). If the result decision unit 115 calculates a likelihood of the inputted word to be high and decides to accept the inputted word (Step 154: accept), then the result decision unit 115 outputs the word of the recognition result, which is given from the primary voice recognition unit 112B, to the result output unit 117 (Step 155). Then, the process returns to Step 152 described above. On the other hand, if the result decision unit 115 calculates a likelihood of the inputted word to be low and decides to reject the inputted word (Step 154: reject), then the result decision unit 115 obtains a voice features from the voice pre-processing unit 112A and outputs the voice features to the communication unit 116. The communication unit 116 sends the input voice features to the communication unit 121 in the server device 120, which serves as an additional voice recognition means, via the communication network 130 (Step 156).

In the server device (additional voice recognition means) 120, when the communication unit 121 receives the voice features from the client terminal device 110 (Step 157), the communication unit 121 outputs the received voice features to the secondary voice recognition unit 123. Then, the secondary voice recognition unit 123 retrieves a word corresponding to the user's voice from the secondary recognition dictionary 122 based on the received voice features so as to perform a secondary voice recognition (Step 158). Thereafter, the secondary voice recognition unit 123 outputs a secondary recognition result obtained by the secondary voice recognition to the communication unit 121. The communication unit 121 sends the secondary recognition result to the communication unit 116 in the client terminal device 110 via the communication network 130 (Step 159).

When the communication unit 116 of the client terminal device 110 receives the secondary recognition result from the server device 120 as an additional voice recognition means (Step 160: secondary recognition result acquisition process), then the communication unit 116 outputs the secondary recognition result to the result output unit 117. The result output unit 117 outputs the voice recognition result in a manner such that the user can recognize the result (Step 161: recognition result output process). Then, when a request to settle the outputted recognition result is inputted into the settled result input unit 118, then the settled result input unit 118 outputs the inputted request to the dictionary content control unit 119 (Step 162: settled result input process). The dictionary content control unit 119 registers new dictionary data in the primary recognition dictionary 113 according to the received request. Further, the dictionary content control unit 119 deletes oldest words from the primary recognition dictionary 113 to update the primary recognition dictionary 113 if the number of registered words exceeds the processing capability of the client terminal device 110 (Step 163: dictionary update control process). Then, the process is terminated.

According to the voice recognition system in the first embodiment, even if the user says a word that is not registered in the primary recognition dictionary 113 of the client terminal device 110, the word can be subjected to voice processing in the server device 120 and provided to the user. Therefore, the voice recognition system can provide a word that matches a user's request even if the client terminal device 110 is small in processing ability.

Further, according to the voice recognition system in the first embodiment, even if a word cannot be recognized by the client terminal device 110, there is a strong possibility that the word can be recognized by the server device 120 (additional voice recognition means) with the secondary recognition dictionary 122 having a large number of registered words. Therefore, even if the user says a word that is not registered in the primary recognition dictionary 113 of the client terminal device 110, such a word can be recognized by the voice recognition system.

Furthermore, according to the voice recognition system in the first embodiment, a word or a set of words that have been recognized in the server device 120 can automatically be added to the primary recognition dictionary 113 in the client terminal device 110. Therefore, it is possible to lighten a load imposed on a user when the primary recognition dictionary 113 is customized for the user.

Figure 5:
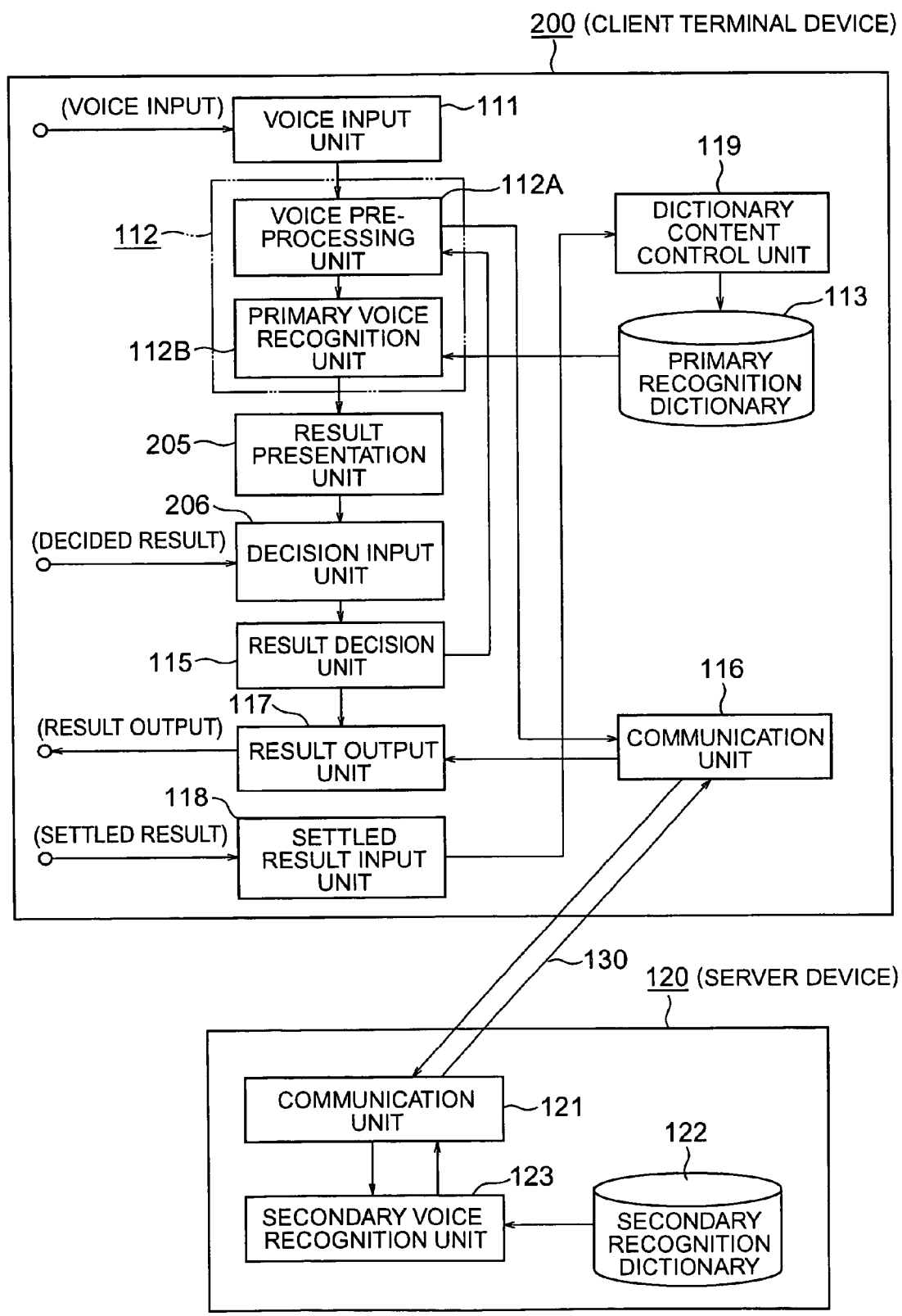
FIG. 5 is a schematic diagram showing an arrangement of a voice recognition system according to a second embodiment of the present invention.

FIG. 5 shows an entire arrangement of a voice recognition system according to a second embodiment of the present invention. As shown in FIG. 5, the voice recognition system includes a client terminal device 200 and a server device 120 as an additional voice recognition means communicable with the client terminal device 200 via a communication network 130. This configuration is similar to the voice recognition system in the first embodiment.

The client terminal device 200 in the second embodiment includes a result presentation unit (recognition result presentation means) 205 for presenting a primary recognition result to an external decision system and a decision input unit (decision input means) 206 for fetching a decision result as decision information from the external decision system. The result presentation unit 205 and the decision input unit 206 are arranged between the primary voice recognition means 112 and the result decision unit (recognition result decision means) 115 both of which have been already described in the first embodiment.

With this structure, an external judgment system judges whether the primary recognition result presented by the result presentation unit 205 is to be accepted or rejected and inputs the decision result to the decision input unit 206. In other words, judgment of the client terminal device 200 depends on the decision of the external decision system that may be a user. In this case, a user may serve as the external decision system. As shown in FIG. 5, other arrangements of the voice recognition system are the same as those of the voice recognition system in the first embodiment (see FIG. 2).

The voice recognition system in the second embodiment has equivalent functions to those in the first embodiment. Additionally, the voice recognition system in the second embodiment has the following functions. Specifically, when a decision result (command) issued by the external decision system (e.g., a user) is inputted into the voice recognition system, the decision result is employed as decision information on the primary recognition result. Accordingly, the user can determine whether the primary recognition dictionary is updated or not. Thus, it is possible to generate a recognition dictionary having a high processing efficiency for voice recognition to ensure enhanced reliability of processing voice information.

The client terminal device 200 may have a memory (not shown) storing a program for voice recognition and a central processing unit (CPU) operable to execute the program stored in the memory so as to operate the voice recognition means 112 (a voice pre-processing unit 112A and a primary voice recognition unit 112B), the result presentation unit 205, the decision input unit 206, the result decision unit 115, the communication unit 116, the result output unit 117, the settled result input unit 118, and the dictionary content control unit 119.

The result presentation unit (recognition result presentation means) 205 is configured to present a primary recognition result, which is outputted from the primary voice recognition unit 112B, to the user (external decision system) in a manner such that the user can recognize the primary recognition result. Then, the user (external decision system) inputs a decision result of accepting or rejecting the presented primary recognition result of a word into the decision input unit (decision input means) 206. The decision input unit 206 serves to fetch the decision result from the user (external decision system). At any rate, the result presentation unit 205 and the decision input unit 206 may be collectively called a result judgment unit or means, together with the result decision unit or means 115 because they serve to decide whether the primary voice recognition result is accepted or rejected.

Figure 6:
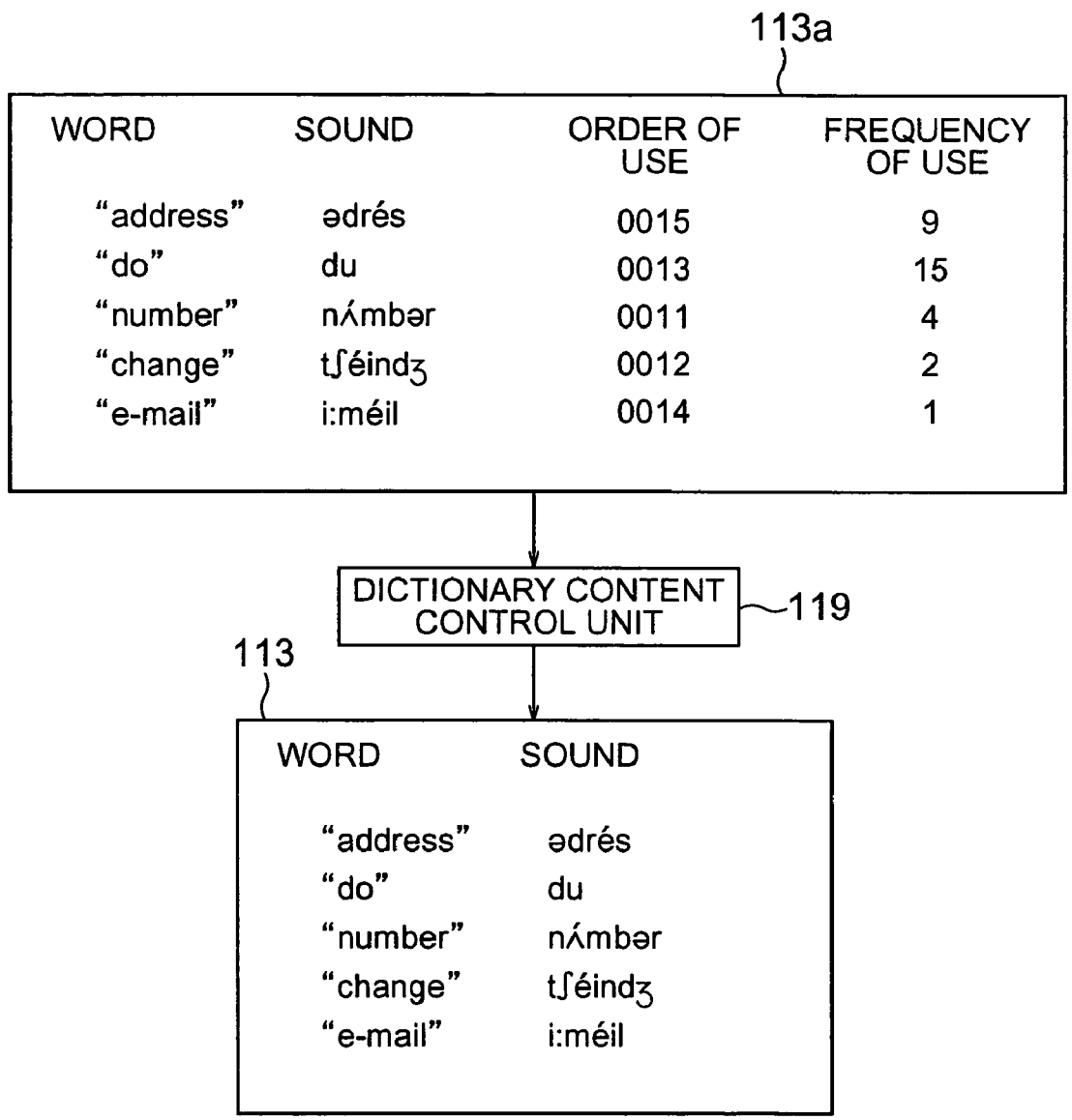
FIG. 6 is an explanatory diagram showing an example of a word history list and a primary recognition dictionary in the voice recognition system shown in FIG. 5.

Here, the dictionary content control unit 119 acts to control and update the primary recognition dictionary 113. The dictionary content control unit 119 has a word history list 113a as shown in FIG. 6. The word history list 113a includes word history data composed of words, phonetic signs or pronunciations of the words, order of use, and frequencies of use. A largest value in order of use means that the word is most recently used. The dictionary content control unit 119 may delete a word having a smallest value in order of use listed in the word history list 113a (e.g., a word "number" in FIG. 6) from the primary recognition dictionary 113 when the primary recognition dictionary 113 has been full of registered words. Alternatively, the dictionary content control unit 119 may delete a word having a lowest frequency of use (e.g., a word "change" in FIG. 6).

When the dictionary content control unit 119 registers a new word in the primary recognition dictionary 113, a largest value in order of use among the registered words in the word history data or a frequency of use "00001" is stored in the word history list 113a for the new word. Here, a word that has been deleted from the primary recognition dictionary 113 may not be deleted from the word history list 113a by the dictionary content control unit 119. Thus, the number of words registered in the word history list 113a is equal to or more than the number of words registered in the primary recognition dictionary 113.

Figure 7:
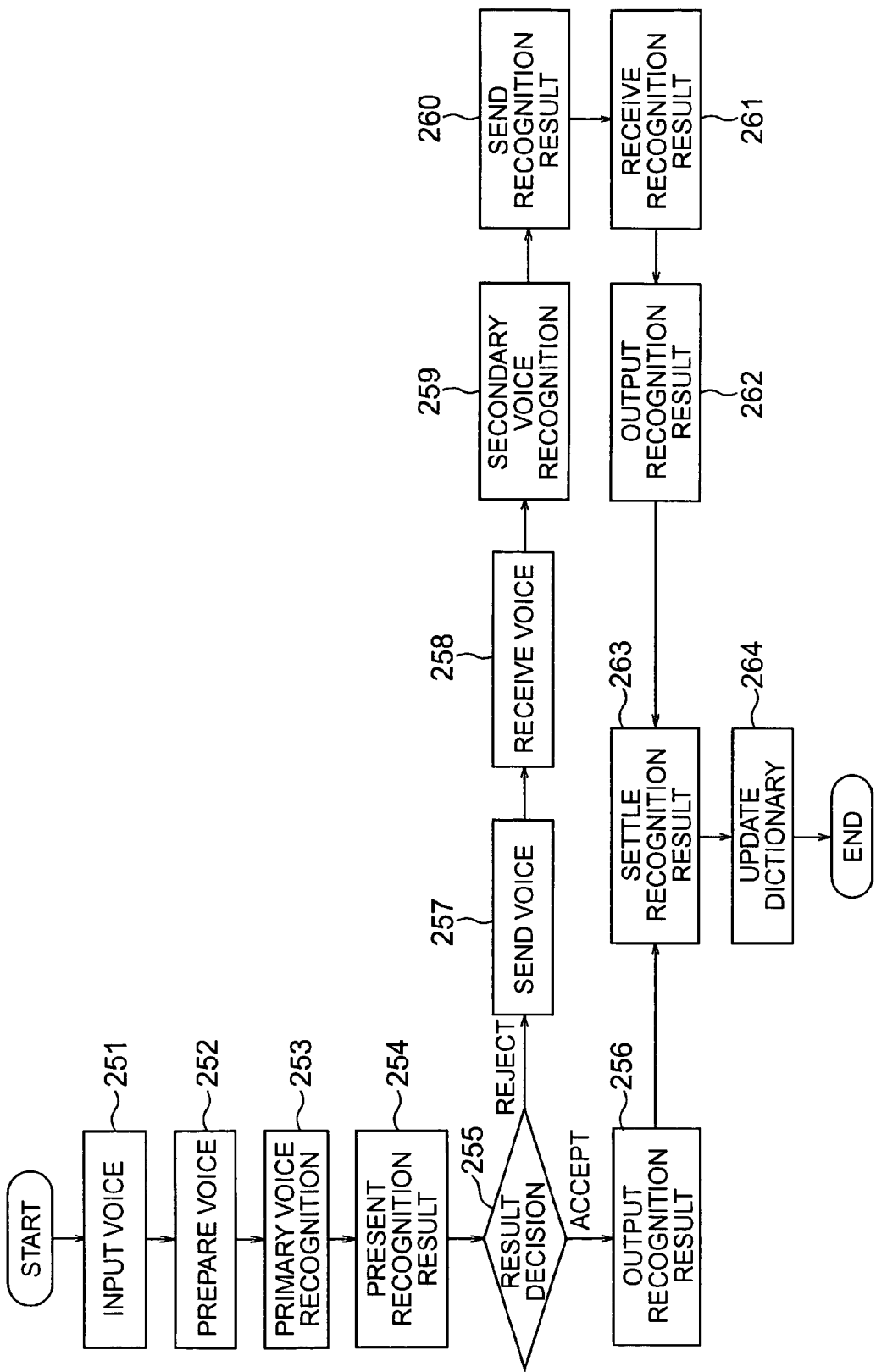
FIG. 7 is a flow chart showing operation of the voice recognition system shown in FIG. 5.

Next, operation of the voice recognition system in the second embodiment will be described with reference to a flow chart shown in FIG. 7.

In this embodiment, when a user's voice is inputted into the voice input unit 111 in the client terminal device 200, the voice input unit 111 outputs the voice to the voice pre-processing unit 112A (Step 251). The voice pre-processing unit 112A extracts voice features of the input voice by a sound analysis (Step 252). Then, the primary voice recognition unit 112B performs a primary voice recognition through retrieval in the primary recognition dictionary 113 based on the features extracted by the voice pre-processing unit 112A (Step 253).

For example, when the user says "e-mail address," the primary voice recognition unit 112B retrieves words from the primary recognition dictionary 113, reads words "e-mail" and "address" from the primary recognition dictionary 113 based on the voice features, and outputs the words "e-mail address" to the result presentation unit 205. If the primary voice recognition unit 112B fails to read any corresponding word from the primary recognition dictionary 113, the primary voice recognition unit 112B outputs a false word to the result presentation unit 205.

Next, the result presentation unit 205 presents the inputted word to the external decision system, e.g., the user (Step 254: recognition result presentation process). Then, the decision input unit 206 receives a decision result of the presented word from the external decision system (decision result input process) and outputs the decision result to the result decision unit 115. The result decision unit 115 decides whether the presented recognition result according to the inputted decision result (Step 255) is to be accepted or rejected. If the result decision unit 115 decides to accept the recognition result (Step 256: accept), then the result decision unit 115 outputs the word of the recognition result, which is inputted from the primary voice recognition unit 112B, to the result output unit 117. Then, the process returns to Step 253 described above.

On the other hand, if the result decision unit 115 decides to reject the recognition result (Step 255: reject), then the result decision unit 115 outputs the voice feature, which has been obtained from the voice pre-processing unit 112A, to the server device (additional voice recognition means) 120 via the communication unit 116. The communication unit 116 sends the voice feature, which has been inputted from the voice pre-processing unit 112A, to the communication unit 121 in the server device 120 via the communication network 130 (Step 257).

When the communication unit 121 in the server device 120 receives the voice features from the client terminal device 200 (Step 258), the communication unit 121 outputs the voice features to the secondary voice recognition unit 123. Then, the secondary voice recognition unit 123 retrieves a word corresponding to the user's voice from the secondary recognition dictionary 122 based on the input voice features so as to perform secondary voice recognition (Step 259). Thereafter, the secondary voice recognition unit 123 outputs a secondary recognition result obtained by the secondary voice recognition to the communication unit 121. The communication unit 121 sends the secondary recognition result to the communication unit 116 in the client terminal device 200 via the communication network 130 (Step 260).

When the communication unit 116 of the client terminal device 200 receives the secondary recognition result from the server device 120 (Step 261), then the communication unit 116 outputs the secondary recognition result to the result output unit 117. The result output unit 117 outputs the secondary recognition result in a manner such that the user can recognize the result (Step 262). Then, when a request to settle or decide the outputted recognition result is inputted into the settled result input unit 118, then the settled result input unit 118 outputs the inputted request to the dictionary content control unit 119 (Step 263). The dictionary content control unit 119 refers to the word history list 113a and registers new dictionary data in the primary recognition dictionary 113 if needed by the received request. If the number of registered words in the primary recognition dictionary 113 exceeds the processing capability of the client terminal device 200, then the dictionary content control unit 119 deletes oldest words from the primary recognition dictionary 113 to update the primary recognition dictionary 113 (Step 264). Then, the process is terminated.

The voice recognition system in the second embodiment has similar effects to those of the voice recognition system in the first embodiment. Further, since a user's past history of use is used in the word history list 113a of the dictionary content control unit 119 as information for the primary recognition dictionary 113 of the client terminal device 200, it is possible to obtain information suitable for the user's preference.

According to the voice recognition system in the first and second embodiments, voice features outputted from the voice pre-processing unit 112A are outputted as voice data to be sent from the client terminal device to the server device. However, a sound wave data may be sent directly to the server device.

Further, the voice recognition system in the first embodiment may employ the dictionary content control unit 119 and the primary recognition dictionary 113 described in the second embodiment.

Furthermore, the voice recognition system in the second embodiment employs order of use and frequencies of use as historical operation data. However, historical operation data are not limited to those examples. Further, order of use and frequencies of use may be employed solely or in combination. The upper limit of the number of words in the primary recognition dictionary 113 may be set according to the processing capability of the system. The upper limit may be dynamically changed if a load varies depending on environments.

Figure 8:
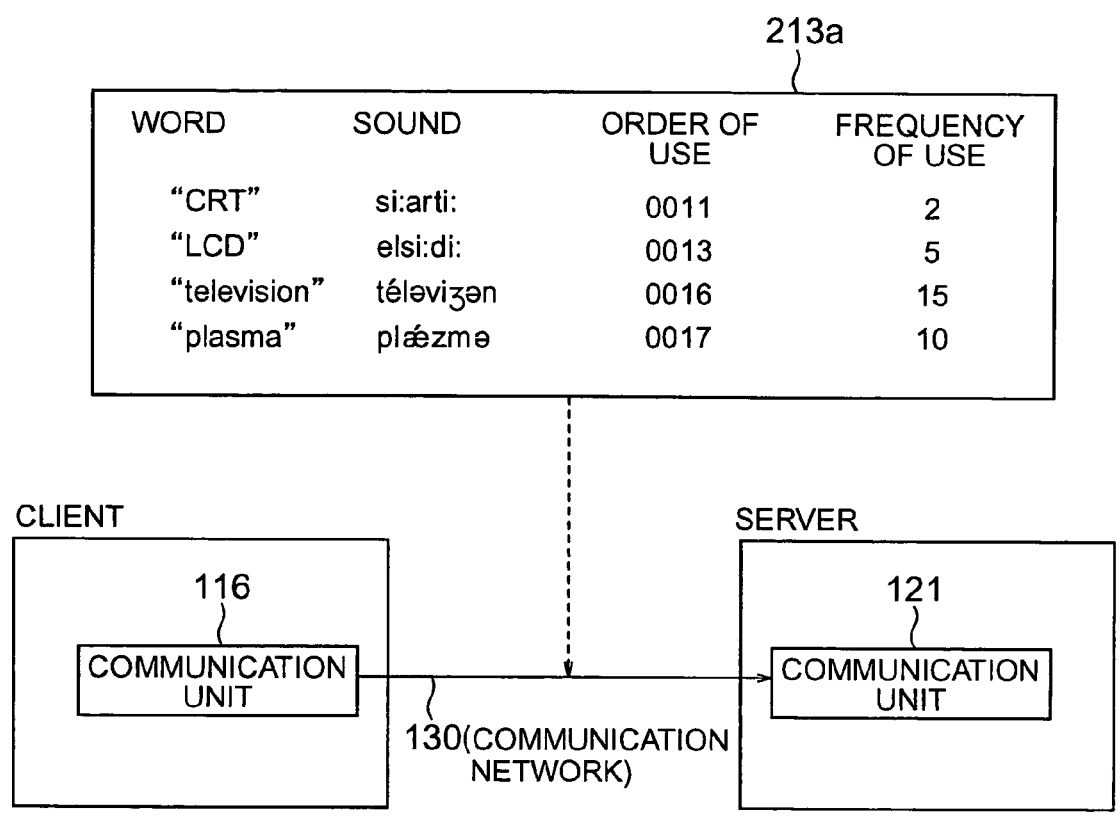
FIG. 8 is an explanatory diagram showing an example of a word history list in a dictionary content control unit of a voice recognition system according to a third embodiment of the present invention.

FIG. 8 is an explanatory diagram showing an example of a word history list 213a in a dictionary content control unit of a voice recognition system according to a third embodiment of the present invention. In the third embodiment, the word history list 213a as shown in FIG. 8 is provided in addition to the dictionary content control unit 119 of the voice recognition system in the first or second embodiment. The dictionary content control unit 119 is configured to control words in the primary recognition dictionary 113 based on the word history list 213a. In this case, information on the word history list 213a is sent from the communication unit 116 of the client terminal device to the server device 120. The server device 120 thus receives the information on the word history list 213a. Accordingly, the server device 120 can obtain user's input histories without requiring user's presence or separately monitoring user's using conditions.

The example shown in FIG. 8 is designed for a market search engine for cellular phones. From the word history list 213a shown in FIG. 8, it is possible to surmise that the user is interested in purchasing a television. Accordingly, a company that manages the server device can send information on new products to the user. Thus, it is possible to utilize the voice recognition system for sales promotion of the company. Further, in the conventional method, a voice recognition result should be analyzed to obtain customer information. However, according to the voice recognition system in the third embodiment, use of the work history list 213a eliminates the need of analyzing a voice recognition result.

In the third embodiment, the voice recognition system sends the work history list 213a from the communication unit 116 of the client terminal device 200 to the server device. However, the user may set the word history list 213a not to be sent to the server device. Further, the user may set the work history list 213a to be sent to the server device each time the client terminal device communicates with the server device 120 for voice recognition.

Although certain preferred embodiments of the present invention have been shown and described in detail, it should be understood that various changes and modifications may be made therein without departing from the scope of the appended claims.

What is claimed is:

1. A voice recognition system for recognizing input voice information pronounced by a user and comprising:

a recognition dictionary for storing voice information;

a primary voice recognition unit which performs primary voice recognition of the input voice information by the use of said recognition dictionary to produce a primary voice recognition result which is specified by a voice feature of the input voice information;

a recognition result judgment unit which judges whether the primary voice recognition result is to be accepted or rejected;

a transceiver unit which sends the voice feature to additional voice recognition means for performing secondary voice recognition, when the primary voice recognition result specified by the voice feature is rejected by said recognition result judgment unit and for receiving a secondary voice recognition result produced by the additional voice recognition means;

a recognition result output unit which outputs the primary voice recognition result specified by the voice feature and outputted from said recognition result judgment unit or the secondary voice recognition result received by said transceiver unit to an exterior of said voice recognition system;

a settled result input unit which receives settlement information on the primary voice recognition result or the secondary voice recognition result outputted to the exterior of said voice recognition system; and a dictionary content control unit which updates said recognition dictionary based on the settlement information inputted by said settled result input unit;

wherein:

said dictionary content control unit has a word history list which includes an order of use of each word and a frequency of use of each word and deletes, from the recognition dictionary, a word based on at least one of the oldest word and the smallest word of the frequency included in the word history list when an amount of the words in said recognition dictionary exceeds a processing capability of said voice recognition system.

2. The voice recognition system as claimed in claim 1, wherein the recognition result judgment unit comprises:

a recognition result presentation unit which presents the primary voice recognition result produced by said primary voice recognition means to an external decision system; and a decision result input unit which receives a decision result to accept or reject the primary voice recognition result from the external decision system.

3. The voice recognition system recited in claim 1, wherein said primary voice recognition unit includes
(i) a voice pre-processing unit operable to analyze the input voice information so as to extract the voice feature thereof, and
(ii) a primary voice recognition unit operable to output the primary voice recognition result specified by the voice feature extracted by said voice preprocessing unit.

4. The voice recognition system recited in claim 1, wherein said dictionary content control unit is operable to send update information to the additional voice recognition means when said recognition dictionary is to be updated.

5. The voice recognition system as recited in claim 1, wherein the additional voice recognition unit is configured by a server device having a voice recognition function, the server device being communicable with said transceiver means via a communication network.

6. A voice recognition method comprising:
inputting input voice information pronounced by a user;
performing primary voice recognition of the voice information based on a recognition dictionary storing voice information to produce a primary voice recognition result specified by a voice feature of the input voice information;
deciding whether to accept or reject the primary voice recognition result specified by the voice feature;
sending the voice feature to additional voice recognition means for performing secondary voice recognition, when the primary voice recognition result specified by the voice feature is rejected;
receiving a secondary voice recognition result produced by the additional voice recognition means;
outputting the primary voice recognition result or the secondary voice recognition result to an exterior of a voice recognition system;
inputting settlement information in response to the primary voice recognition result or the secondary voice recognition result outputted to the exterior of the client terminal device
updating the recognition dictionary based on the inputted settlement information by the use of a word history list which includes an order of use of each word and a frequency of use of each word; and
deleting, from the recognition dictionary, a word based on at least one of the oldest work and the smallest word of the frequency included in the word history list when an amount of the words in said recognition dictionary exceeds a processing capability of said client terminal device.

7. The voice recognition method recited in claim 6, wherein the deciding step comprises:

presenting the primary voice recognition result to an external decision system; and
receiving a decision result to accept or reject the primary voice recognition result from the external decision system.

8. The voice recognition method claimed in claim 6, wherein the word history list is accessed through a communication network to send information on the word history list from the client terminal device to the exterior.

9. The voice recognition method recited in claim 6, wherein said updating the recognition dictionary comprises:
sending update information to the additional voice recognition means when updating said recognition dictionary.

10. A non-transitory computer-readable storage medium having a program recorded thereon for executing a procedure with a computer, said procedure comprising:
inputting a voice information of a user;
performing primary voice recognition of the voice information based on a recognition dictionary storing voice information to produce a primary voice recognition result of the input voice information;
judging whether to accept or reject the primary voice recognition result;
sending the input voice information of the user to additional voice recognition means for performing secondary voice recognition when the primary voice recognition result is rejected;
receiving a secondary voice recognition result produced by the additional voice recognition means;
outputting the primary voice recognition result or the secondary voice recognition result to an exterior of a voice recognition system; inputting settlement information on the primary voice recognition
result or the secondary voice recognition result outputted to the exterior of the voice recognition system;
updating the recognition dictionary based on the inputted settlement information by the use of a word history list which includes an order of use of each word and a frequency of use of each word, and
deleting, from the recognition dictionary, a word based on at least one of the oldest word and the smallest word of the frequency included in the word history list when an amount of the words in said recognition dictionary exceeds a processing capability of said voice recognition system.

11. The non-transitory computer-readable storage medium claimed in claim 10, wherein the judging step comprises the steps of:
presenting the primary voice recognition result to an external decision system; and
receiving a decision result to accept or reject the primary voice recognition result from the external decision system.

12. The non-transitory computer-readable storage medium recited in claim 10, wherein said updating step of updating the recognition dictionary comprises sending update information to the additional voice recognition means when updating said recognition dictionary.

* * * * *